(12) United States Patent
Ammann et al.

(10) Patent No.: US 9,856,378 B2
(45) Date of Patent: Jan. 2, 2018

(54) PROCESS FOR MANUFACTURING A SURFACE-TREATED COMPACTED MATERIAL PROCESSABLE ON A SINGLE SCREW PLASTICS CONVERSION EQUIPMENT

(75) Inventors: Ernst Ammann, Mühlethal (CH); Michael Knerr, Oftringen (CH); Peter Haldemann, Rothrist (CH); Emil Hersche, Wollerau (CH)

(73) Assignee: Omya International AG, Oftringen (CH)

( * ) Notice: Subject to any disclaimer, the term of this patent is extended or adjusted under 35 U.S.C. 154(b) by 133 days.

(21) Appl. No.: 13/378,911

(22) PCT Filed: Jun. 22, 2010

(86) PCT No.: PCT/IB2010/052810
§ 371 (c)(1),
(2), (4) Date: Dec. 16, 2011

(87) PCT Pub. No.: WO2010/150182
PCT Pub. Date: Dec. 29, 2010

(65) Prior Publication Data
US 2012/0095136 A1    Apr. 19, 2012

Related U.S. Application Data

(60) Provisional application No. 61/269,882, filed on Jun. 30, 2009.

(30) Foreign Application Priority Data
Jun. 23, 2009    (EP) ................... 09163509

(51) Int. Cl.
| C08J 3/20 | (2006.01) |
| C09C 3/10 | (2006.01) |
| C08L 97/02 | (2006.01) |
| C08J 3/22 | (2006.01) |
| B29B 9/12 | (2006.01) |
| C09C 1/02 | (2006.01) |
| C08K 9/04 | (2006.01) |
| C08L 3/04 | (2006.01) |
| C08K 3/18 | (2006.01) |
| C08K 3/22 | (2006.01) |
| C08K 3/34 | (2006.01) |
| C08K 5/56 | (2006.01) |
| B29K 105/16 | (2006.01) |

(52) U.S. Cl.
CPC ............ C08L 97/02 (2013.01); B29B 9/12 (2013.01); C08J 3/20 (2013.01); C08J 3/22 (2013.01); C08J 3/223 (2013.01); C08K 3/18 (2013.01); C08K 3/22 (2013.01); C08K 3/34 (2013.01); C08K 5/56 (2013.01); C08K 9/04 (2013.01); C08L 3/04 (2013.01); C09C 1/021 (2013.01); C09C 3/10 (2013.01); *B29K 2105/16* (2013.01); *C01P 2004/03* (2013.01); *C01P 2004/61* (2013.01); *C01P 2006/12* (2013.01)

(58) Field of Classification Search
CPC ........ C09C 3/10; C08J 3/20; C08J 3/22; C08J 3/223
USPC ........................................ 524/425
See application file for complete search history.

(56) References Cited

U.S. PATENT DOCUMENTS

| 3,318,826 A | 5/1967 | Bridgeford | |
| 3,846,360 A | 11/1974 | Needham | |
| 3,976,608 A | 8/1976 | Buckler et al. | |
| 4,792,484 A * | 12/1988 | Moritani ............. B32B 27/18 | |
| | | | 206/204 |
| 4,803,231 A * | 2/1989 | Seinera et al. ............. 523/219 |
| 5,744,530 A | 4/1998 | Skelhorn | |
| 6,114,454 A * | 9/2000 | Blanchard et al. ......... 525/221 |
| 6,156,836 A * | 12/2000 | Iwanami et al. ............ 524/451 |
| 7,238,739 B2 | 7/2007 | Hawrylko et al. | |

(Continued)

FOREIGN PATENT DOCUMENTS

| CN | 1560139 A | 1/2005 |
| CN | 101070411 A * | 11/2007 |

(Continued)

OTHER PUBLICATIONS

Derwent abstract 1982-84459E for JP 57-138909 A, published Aug. 27, 1982.*

(Continued)

*Primary Examiner* — Vickey Nerangis
(74) *Attorney, Agent, or Firm* — Amster, Rothstein & Ebenstein LLP

(57) ABSTRACT

The present invention relates to the field of processing thermoplastic polymers, particularly the present invention relates to a process for manufacturing compacted material suitable for the use in thermoplastic polymers without a compounding step, comprising the steps of a) providing at least one primary powder material; b) providing at least one molten surface treatment polymer; c) simultaneously or subsequently feeding the at least one primary powder material and the at least one molten surface treatment polymer into the high speed mixer unit of a cylindrical treatment chamber; d) mixing the at least one primary powder material and the at least one molten surface treatment polymer in the high speed mixer, e) transferring the mixed material obtained from step d) to a cooling unit, as well as the compacted material obtained by this process and its use in thermoplastic polymers.

23 Claims, 2 Drawing Sheets

(56) References Cited

U.S. PATENT DOCUMENTS

| | | |
|---|---|---|
| 2003/0050378 A1 | 3/2003 | Blanchard et al. |
| 2005/0049346 A1 | 3/2005 | Blanchard et al. |
| 2006/0229410 A1 | 10/2006 | Wang |
| 2008/0064812 A1 | 3/2008 | Narayan et al. |

FOREIGN PATENT DOCUMENTS

| | | | |
|---|---|---|---|
| JP | H1135697 A | 2/1999 | |
| JP | H11189699 A | 7/1999 | |
| JP | 2008050592 A | 3/2008 | |
| WO | 9517441 A1 | 6/1995 | |
| WO | WO 9935182 A1 * | 7/1999 | ......... B29C 47/0011 |
| WO | 0044548 A1 | 8/2000 | |
| WO | 0158988 A1 | 8/2001 | |
| WO | 02069729 A1 | 9/2002 | |
| WO | 2005065067 A2 | 7/2005 | |
| WO | 2005108045 A2 | 11/2005 | |
| WO | 2007066362 A1 | 6/2007 | |

OTHER PUBLICATIONS

Liu et al. "A novel approach in preparing polymer/nano-CaCO3 composites." Front. Chem. Eng. China 2008, 2(1): 115-122.

Liang "Effects of extrusion conditions on die-swell behavior of polypropylene/diatomite composite melts." Polymer Testing 27 (2008) 936-940.

Yang et al. "Mechanical properties and volume dilatation of HDPE/CaCO3 blends with and without impact modifier." Polymer Engineering and Science 2006, 1512-1522.

Notice of Opposition dated Feb. 23, 2015 for EP Patent No. 2445973.

Patent Owner's Response dated Oct. 19, 2015 in Opposition to EP Patent No. 2445973.

Summons to Attend Oral Proceedings dated Dec. 23, 2016 for Opposition to EP Patent 2445973.

Reply by Opponent dated Jun. 24, 2016 in Opposition to EP Patent No. 2445973.

E15—Design, Manufacturing and Applications of Composites, DEStech Publications, Inc., dated Jul. 26-29, 2010, edited by A.D. Ngo et al.

E18—Report 78: J. Leadbitter et al., "PVC—Compounds, processing and applications." vol. 7, No. 6, 1994.

English Translation of CN 101070411 A1, Nov. 14, 2007.

Office Action dated Feb. 25, 2014 for Japanese Application No. 2012-516932.

Office Action dated Jan. 6, 2015 for Japanese Application No. 2012-516932.

Gopakumar et al. "Polypropylene/Graphite Nanocomposites by Thermo-Kinetic Mixing." Polymer Engineering and Science, Jun. 2004, vol. 44, No. 6., pp. 1162-1169.

* cited by examiner

PROCESS FOR MANUFACTURING A SURFACE-TREATED COMPACTED MATERIAL PROCESSABLE ON A SINGLE SCREW PLASTICS CONVERSION EQUIPMENT

CROSS-REFERENCE TO RELATED APPLICATIONS

This application is U.S. National phase of PCT Application No. PCT/IB2010/052810, filed Jun. 22, 2010, which claims priority to European Application No. 09163509.4, filed Jun. 23, 2009 and U.S. Provisional Application No. 61/269,882, filed Jun. 30, 2009.

The present invention relates to the field of processing thermoplastic polymers, particularly the present invention relates to a process for manufacturing compacted material suitable for the use in thermoplastic polymers without a compounding step, as well as the compacted material obtained by this process and its use in thermoplastic polymers.

Compounding consists in preparing plastic formulations, by mixing or/and blending polymers and additives in a molten state. There are different critical criteria to achieve a homogenous blend of the different raw material. Dispersive and the distributive mixing as well as heat are important factors. Co-Kneaders and twin screws (co- and counter rotating) as well internal mixers are the most common used compounder in the plastic industries.

For decades, the thermoplastic processing industry uses additives for preparing modified thermoplastic resin compositions, which are to a great extent introduced into the polymer resins via compounding technologies requiring the formation of intermediate products named masterbatches/concentrates or compounds.

For example, WO 95/17441 discloses a method of preparing a thermoplastic resin end-product comprising the preparation of thermoplastic granules for blending them with the thermoplastic resin.

In WO 01/58988, a method for preparing masterbatches or concentrates of mineral fillers to achieve highly filled thermoplastic materials are described.

However, according to these documents, it is not possible to obtain a polymeric end-product having the primary powder compounds well dispersed in a conventional single screw extruder. Rather, it is required to produce an intermediate product like a masterbatch, or concentrate, i.e. it is not possible to disperse fine primary powders on conventional single screw machines without intermediate compounding step.

In this respect, further documents such as WO 2007/066362 describe a mixing process and device with only one material inlet, while others like EP 1 156 918, WO 2005/108045 or WO 2005/065067 relate to extruders or element mixers.

However, there is still a need for an easy and effective way of manufacturing additives from primary powders, which are suitable to be introduced in thermoplastic polymers without the need of any intermediate steps.

Accordingly, it is a first object of the present invention to provide a process for manufacturing materials suitable for being incorporated in thermoplastic polymers by a continuous or discontinuous process, wherein the primary powder material to be introduced into the thermoplastic polymer can be well dispersed in a conventional single screw extruder.

This object is achieved by the process according to the present invention, namely a process for manufacturing a compacted material characterised in that it comprises the following steps:
 a) providing at least one primary powder material;
 b) providing at least one molten surface treatment polymer;
 c) simultaneously or subsequently feeding the at least one primary powder material and the at least one molten surface treatment polymer into the high speed mixer unit of a cylindrical treatment chamber;
 d) mixing the at least one primary powder material and the at least one molten surface treatment polymer in the high speed mixer,
 e) transferring the mixed material obtained from step d) to a cooling unit.

Without being bound by any theory, the Applicant believes that it is possible for the compacted material to be well dispersed in the thermoplastic polymer, i.e. without the formation of any agglomerates, using conventional single screw extrusion equipment due to the combination of two factors, namely the use of high speed mixers combined with the use of surface treatment polymers which are able to form thin layers around the singularised particles of the primary powder which totally cover the particles surfaces resulting in a surface-treated compacted material. The singularized and coated particles may then form loose conglomerates, but are still separated by the polymeric surface layers. This is the desired step of compaction. The result of the compaction is an increase in bulk density, an improvement of the flowability and the suppression of dust as described in more detail below.

Well dispersed means that dispersions, which are visually tested on pressed film under a binocular magnifier with magnification of 50 of each of the dispersions made, show no black spots corresponding to the matrix polymers nor white spots corresponding to the primary powders.

By compacted material, a bulk material is understood to consist of a conglomerate of a number of single particles forming a material with a mean particle size ranging from 10 μm to 10 mm measured by sieve analysis using the Retsch AS 200 sieve tower according to ISO 3310 standard.

In a preferred embodiment, a further surface treatment agent, preferably at least one surface treatment agent is fed simultaneously with or after the feeding of the at least one primary powder product into the high speed mixer unit of a cylindrical treatment chamber. The surface treatment agent preferably is liquid or liquefied, especially it is provided in the molten state.

The main difference between the surface treatment agent and the surface treatment polymer is that the surface treatment agents are chemically bound to the primary powder. Preferably, they serve, inter alia, to alter the surface tension of the powder and thus the hydrophobicity thereof. On the other hand, as mentioned below, also waxes can be used as surface treatment agent, which are not chemically bound, but particularly serve to improve dispersion and especially reduce the viscosity of high viscosity surface treatment polymers.

In contrast to this, surface treatment polymers are used to separate the single particles in the compacted material, and are not chemically bound to the surface of the primary powder particles.

According to the present invention, the surface treatment polymers preferably have a viscosity at 170° C. of above 500 mPa·s, whereas the viscosity at 170° C. of the surface treatment agents preferably is below 500 mPa·s.

The process according to the present invention furthermore allows for the use of extremely low concentrations of surface treatment products, i.e. surface treatment polymer and surface treatment agent, such as concentrations ranging from 2% to 10% by weight based on the weight of the obtained compacted material, reducing the negative effects on the thermoplastic base polymer and increasing the compatibility thereof.

It may furthermore be advantageous that before step e), i.e. before the mixed material obtained from step d) is transferred to a cooling unit, it is transferred to a second mixing unit.

In this second mixing unit optionally further at least one molten surface treatment polymer is added to and mixed with the mixed material of step d).

A further embodiment of the process according to the invention is that the temperature of the primary powder material is between 20° C. and 300° C., preferably between 60° C. and 250° C.

In this respect, the temperature of the optional surface treatment agent which may be added, is between 20° C. and 300° C., preferably 60° C.-250° C., and more preferably between 60° C. and 120° C.

However, the maximum temperature has to be below the decomposition temperature of any one of the ingredients.

The primary powder according to the invention may be any powder as derived from processes such as chemical reactions, grinding or milling, with or without primary surface treatments, e.g. with fatty acids such as stearic acid, palmitic acid, etc.

It may be of natural origin or synthetic.

In a preferred embodiment of the process according to the invention the primary powder material is an inorganic powder.

Then, the inorganic powder may be selected from the group comprising natural ground calcium carbonate (GCC); precipitated calcium carbonate (PCC); calcium carbonate-containing minerals such as dolomite, mixed carbonate based fillers such as calcium associated with magnesium containing mineral, such as talc, or with clay; mica; and mixtures of same, such as talc-calcium carbonate or calcium carbonate-kaolin mixtures, or mixtures of natural ground calcium carbonate with aluminium hydroxide, mica or with synthetic or natural fibres, or co-structures of minerals such as talc-calcium carbonate or talc-titanium dioxide co-structures.

Preferably the inorganic powder is natural ground calcium carbonate (GCC), or precipitated calcium carbonate (PCC), or a mixture of GCC and PCC, or a mixture of GCC and PCC and clay, or a mixture of GCC and PCC and talc, or talc, or mica.

In a preferred embodiment, the inorganic powder is selected from GCC, which preferably is selected from the group comprising marble, chalk, calcite and limestone; PCC, which is preferably selected from the group comprising aragonitic PCC, vateritic PCC, calcitic PCC, rhombohedral PCC, scalenohedral PCC; and mixtures thereof.

In another embodiment, the primary powder material is an organic powder.

Then, the organic powder is preferably selected from the group comprising wood flour and modified starch.

The molten surface treatment polymer should advantageously have a viscosity such as between 500 and 400 000 mPa·s, more preferably between 1000 mPa·s and 100000 mPa·s, at 170° C. It is preferably selected from the group comprising ethylene copolymers, e.g. ethylene-1-octene copolymers, metallocene based polypropylenes, polypropylene homopolymer, preferably amorphous polypropylene homopolymers.

The optional surface treatment agent advantageously is selected from the group comprising stearic acid, zinc oxide, synthetic paraffin wax, polyethylene metallocene wax and polypropylene wax.

It has to be noted that conventional functional components like impact modifiers, stabilizers, etc. may be included during the mixing process, or to the finished surface treated compacted material, as well in the final product, i.e. the compounded thermoplastic resin.

An advantage of the process according to the present invention lies in the fact that it is a low cost manufacturing process resulting in lower cost end-product.

This, inter alia, is due to the fact that the surface-treated compacted material is processable on a conventional single-screw plastics conversion equipment without the need to compound this surface treated material.

Thus, within the different variants and embodiments of the method according to the invention, the cylindrical treatment chamber preferably contains one single-screw high speed mixer, in a horizontal or vertical position.

Especially useful in the present invention are conventional commercially available cylindrical treatment chambers containing a single-screw high speed mixer, having e.g. the following parameters:

length 350 mm, diameter 90 mm, at 1000-4000 rpm; length 1200 mm, diameter 230 mm, at 400-3000 rpm; length 150 mm, diameter 150 mm, at 600-1300 rpm.

Preferably the ratio length:diameter is from 1:1 to 6:1, more preferably from 2:1 to 5:1, especially 3:1 to 4:1.

Thus, conventional compounding processes such as those using twin-screws or Farrel continuous mixers, co-kneaders, Banbury batch-mixers, or other equivalent equipments can be eliminated.

A second aspect of the present invention relates to the surface-treated compacted material obtained by the process according to the present invention.

The surface-treated compacted material according to the invention is preferably characterised in that it is completely re-dispersible in a thermoplastic polymer matrix without any compounding step. By completely re-dispersible it is understood that dispersions, which are visually tested on pressed film under a binocular magnifier with magnification of 50 of each of the dispersions made, show no black spots corresponding to the matrix polymers nor white spots corresponding to the primary powders.

Such surface-treated compacted materials advantageously are non-dusting. Such non dusting compacted material, preferably has a screen residue of more than 80 wt-%, preferably more than 90 wt-% on a 45 μm screen according to ISO 3310 standard measured by sieve analysis using a Retsch AS 200 sieve tower In the surface treated compacted material, the content of primary powder material advantageously is from 50 to 99 wt-%, preferably from 60 to 98 wt-%, more preferably from 75 to 95 wt-%, most preferably from 80 to 90 wt-%, e.g. 85 wt-%.

For example, if the primary powder is GCC, it may be present in the surface treated compacted material in an amount of from 75 to 98 wt-%, preferably of from 86 to 92 wt-%. If the primary powder is talc, it is especially preferred if it is present in the surface treated compacted material in an amount of from 75 to 90 wt-%, more preferably of from 76 to 87 wt-%.

The content of surface treatment polymer in the compacted material typically is from 1 to 50 wt-%, preferably from 2 to 40 wt-%, more preferably from 5 to 25 wt-%, especially, from 8 to 14 wt-%, e.g. from 10 to 13 wt-%.

If surface treatment agent is used in the compacted material according to the present invention, its content is generally dependent on the specific surface area of the primary powder. Advantageously, is present in an amount of from 0.01 to 10 wt-%, preferably from 0.1 to 7 wt-%, more preferably from 0.5 to 5 wt-%, e.g. from 1 to 3 wt-%. For example, if the primary powder is GCC, the surface treatment agent typically is present in an amount of 0.01 wt-% to 10 wt-%, preferably 0.1 wt-% to 3 wt-% based on the total weight of the compacted material.

A typical example of a compacted material according to the invention comprises 90 wt-% primary powder, 9.5 wt-% surface treatment polymer and 0.5 wt-% surface treatment agent.

The third object of the present invention concerns the use of the obtained compacted materials as additives in thermoplastic polymers.

Accordingly, the invention allows the uniform dispersion of the compacted materials into thermoplastic polymers at any concentration of the compacted material ranging from 0.1 to 80 wt-%, preferably from 1 to 50 wt-%, and more preferably from 5 to 30 wt-%, without the need of preparing intermediate masterbatches also named concentrates and/or compounds for the formation of the polymeric end-products.

A further aspect of the invention is the use of the surface-treated compacted material according to the invention as an additive in thermoplastic polymers, as well as a process of manufacturing thermoplastic polymers by direct addition of the surface-treated compacted materials into the final thermoplastic polymers.

The surface-treated compacted materials according to the present invention can be used in the manufacture or processing of any conventional thermoplastic polymers, especially in polyolefinic, polystyrenic, polyvinylic, or polyacrylic polymers and/or copolymers. For example, the surface-treated compacted materials according to the present invention may be used in polymers such as low density polyethylene (LDPE), linear low density polyethylene (LLDPE), high density polyethylene HDPE, polypropylene (PP) such as polypropylene homopolymers, random polypropylene, heterophasic polypropylene or block copolymers including polypropylene units, polystyrene (PS), high impact polystyrene (HI-PS), and polyacrylate.

In this respect, the surface-treated compacted material can serve as an additive in the manufacture of blown films, sheets, pipe profiles, and in such processes like extrusion of pipes, profiles, cables fibres or the like, compression moulding, injection moulding, thermoforming, blow moulding, rotational moulding, etc.

Finally, a further aspect of the invention are thermoplastic polymers comprising the compacted materials according to the invention.

The scope and interest of the invention will be better perceived thanks to the following examples which are intended to illustrate certain embodiments of the invention and are non-limitative.

EXAMPLES

Example 1

Figure 1:
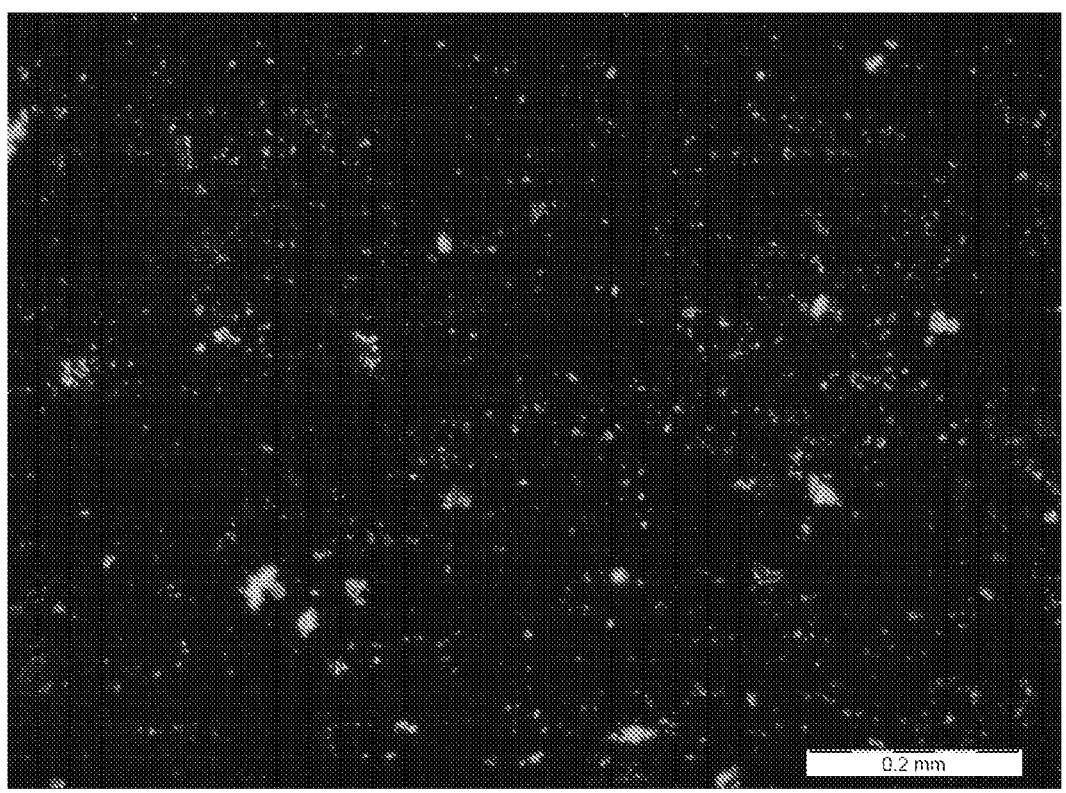
FIG. 1 is a microscopic picture of the initial powder of Example 1

This example relates to the preparation of a surface-treated non-dusting compacted material according to the present invention.

A horizontal "Ring-Layer-Mixer/Pelletizer", namely "Amixon RMG 30" with process length of 1200 mm, and diameter of 230 mm, equipped with 3 feeding ports in sequence, and 1 out-let port, was used. The cylinder is fitted with a heating/cooling double wall. Surface treatment and compacting is obtained by a rotating, cylindrical, pin-fitted screw.

Component A (Primary Powder Material):

Natural calcium carbonate (GCC) with a mean particle size of 2.7 µm, treated with 0.5 wt-% stearic acid, is preheated to 110° C., and fed gravimetrically into the first feed port at the rate of 22.6 kg/hr.

Component B: (Surface Treatment Polymer)

Component B is injected in liquid state at a temperature of 230° C. through feeding port 2 at the required rate (kg/hr.) related to component A to be surface treated, in this example at 2.4 kg/hr.

Component B consists of a blend of:
- 80 wt-% ethylene-1-octene-copolymer (e.g. Affinity GA 1900/Dow), Density (ASTM D792) 0.87 g/cm$^3$
- 20 wt-% metallocene based polypropylene wax (e.g. Licocene PP-1302/Clariant), Density (23° C.; ISO 1183)) 0.87 g/cm$^3$.

Mixing

Surface treatment and compacting is carried out in the "Ring-Layer-Mixer/Pelletizer" at 180° C. and a screw speed of 800 rpm.

The surface treated product leaves the Mixer/Pelletizer through the outlet port, is transferred by gravity into a second Ring-Layer-Mixer/Pelletizer for compacting and cooling, operated at a temperature of 140° C. and a screw speed of 400 rpm. In this example, both units are of identical size and dimensions. The resulting surface treated and compacted material leaves the unit through the outlet port, and is free of dust and free flowing.

Application:

The surface treated/compacted material has a concentration of 90.5 wt-% of calcium carbonate (GCC). The quality of the surface treatment is evaluated by the degree of re-dispersion when extruding a blend of compacted material and virgin polymer.

Precisely, in this example, for the blown film production, a LLDPE (Dowlex NG 5056G/Dow) was used, adding 17 wt-% of the compacted material and 83 wt-% weight of said LLDPE.

The equipment used therefor was a conventional Dr. Collin single screw extruder, Type E-25P, equipped with blown film die of 60 mm diameter and 1.2 mm thickness. Temperature profile for the extruder was at 220° C., screw speed at 70 rpm.

Both products, LLDPE resin and the compacted material were fed by gravimetric dosing. The resulting film had a thickness of 40 µm.

For comparison, a standard type, LLDPE-based calcium carbonate master batch, containing 70 wt-% of calcium carbonate (Omyalene 2011A/Omya), is processed under identical conditions and the same final concentration of calcium carbonate in the film.

The resulting films for both products, the compacted material and Omyalene 2011A are visually controlled under a binocular magnifier with magnification of 50 and found free of any undispersed agglomerates. For further evaluation, both blown film samples containing 17 wt-% of the compacted material, and 22 wt-% of master batch (Omyalene 2011A), respectively, were tested for Dart-drop test (ASTM D 1709) and Elemendorf-tear resistance test (ISO 6383-2).

The film made with the compacted material had a dart drop of 620 g and a tear resistance of 710 cN and 810 cN in machine and cross direction.

The film containing masterbatch had a dart drop value of 630 g and a tear resistance of 670 cN and 880 cN in machine and cross direction.

These results confirm the complete and uniform dispersion of the calcium carbonate (GCC) of the compacted material when processed on a standard single screw extruder.

Free flow properties of the compacted material are evaluated by DIN-53492 standard.

Results are:

| | |
|---|---|
| untreated natural calcium carbonate powder: | 10 mm opening: no flow |
| compacted material as per example 1: | 10 mm opening: 7 sec/150 g |

Particle Size

Evaluation according to ISO 3310.

| Result: | 92 wt-% | <500 microns |
|---|---|---|
| | 56 wt-% | <250 microns |
| | 35 wt-% | <160 microns |
| | 4 wt-% | <45 microns |

These results confirm that the compacted material of example 1 is free of dust and free flowing.

Figure 2:
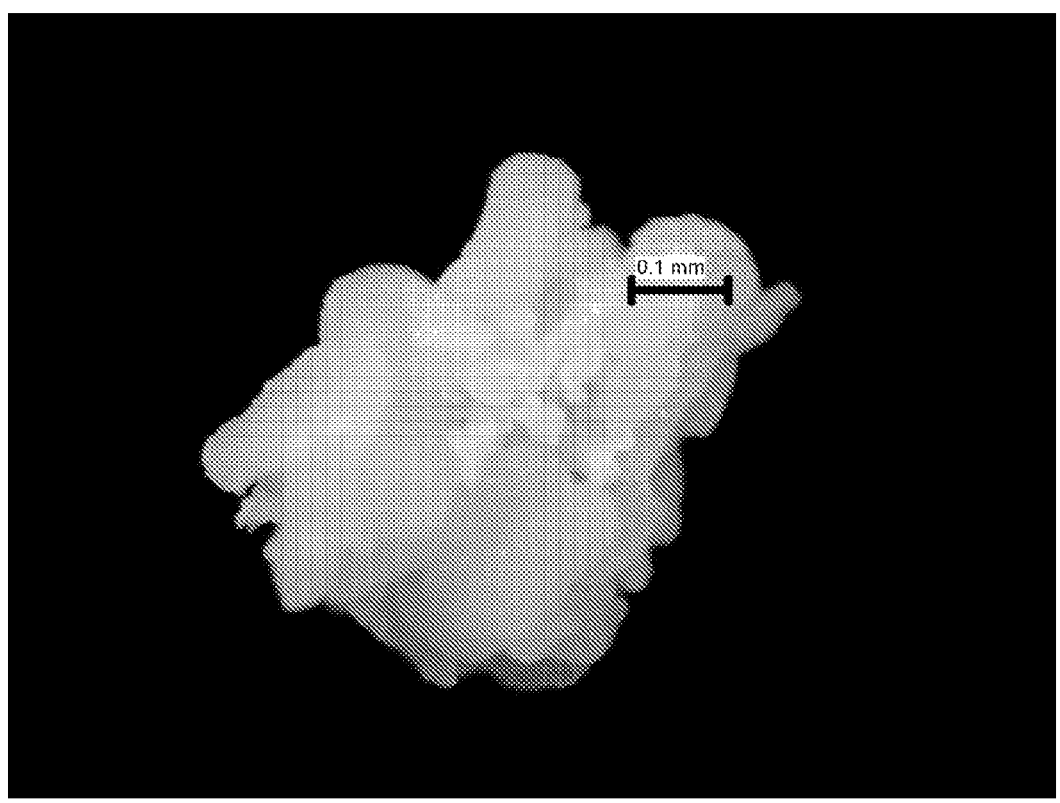
FIG. 2 is a microscopic picture of the compacted material of Example 1.

The effect of the process is also clearly shown looking at FIG. 1, being a microscopic picture of the initial powder and FIG. 2 being a microscopic picture of the compacted material of example 1.

Example 2

For surface treatment and cooling, the same equipment and processing parameters were used as in example 1.
Component A (Primary Powder Material):
  Natural talc powder with a mean particle size of 10 μm (Finntalc M30SL/Mondo Minerals) is gravimetrically fed into feed port 1 at a rate of 20 kg/hr.
Component B (Surface Treatment Polymer):
  Component B is injected in liquid state at a temperature of 230° C. into feed port 2 at a rate of 5 kg/hr.
  Component B Consists of a Blend of:
    90 wt-% metallocene based PP (e.g. Metocene HM 1425/Lyondel-Basell).
    10 wt-% Zn-stearate (e.g. Zincum 5/Baerlocher).
  The resulting, surface treated and compacted material contains 80 wt-% of talc, is free of dust and free flowing.
Application:
  The degree of dispersability is evaluated by extruding a blend of 20 wt-% of the compacted material and 80 wt-% of virgin polymer. The extrusion is carried out on a conventional Dr. Collin single screw extruder type E25P, fitted with a flat die (2×20 mm opening) at a temperature profile of 190° C. and a screw speed of 80 rpm. The resulting stripe is then pressed on a hot press to a sheet of 0.2 mm thickness.

For this example, a polypropylene homopolymer type TM-6100K/Montell and a HDPE type Hostalene GC-7200/Clariant were used as the virgin polymers.

By visual examination of the pressed sheets under a binocular magnifier with magnification of 50, no agglomerates or undispersed particles could be detected, and the dispersion is judged as excellent in both polymers.

Free flow properties of the compacted materials are evaluated by DIN-53492 standard.

Results are:

| | |
|---|---|
| untreated natural talc powder: | 10 mm opening: no flow |
| compacted material as per example 2: | 10 mm opening: 18 sec/150 g |

Example 3

For the powder treatment a high speed batch mixer from MTI-Mischtechnik Industrieanlagen GmbH Type LM 1.5/2.5/5 with a 2.5l vessel and with a three part standard mixing tool was used. The mixer was heated to 175° C. 364 g of a calcium carbonate like in example 1 were filled in the vessel. The vessel was closed and the mixer was run for 2 minutes at 700 rpm. Then the mixer was opened and 32 g of polypropylene homopolymer with a solid density of 0.86 g/ml and a melting point (DSC) of 152° C. plus 4 g zinc oxide type Barlocher Zincum 5 were added to the preheated powder. The mixer was closed again and run for 12 minutes at 700 rpm.

To test the dispersion of the obtained treated powder a Dr. Collin lab extruder FT—E20T—IS with a standard screw and with a standard tape die was used. All heating zones were heated to 175° C. and the extruder was run at 100 rpm. 80 wt-% HDPE Type LyondellBasell Hostalen GC 7260 and 20 wt-% of the obtained powder were continuously fed in the extruder by a gravimetric dosage system. 10 g of extruded tape were then compression moulded between two chromed steel plates at 190° C. The obtained film was optically inspected under a binocular magnifier with magnification of 50 and showed no visible agglomerates.

Example 4

The compacted material of example 1, containing 90.5 wt-% of natural calcium carbonate and 9.5 wt-% of surface treatment polymer was evaluated for sheet extrusion applications in polystyrene.

General purpose polystyrene from BASF type 158K (GPPS) and high impact polystyrene from BASF type 486M (HIPS) were used. 56 wt-% of each polystyrene were added to 44 wt-% of said compacted material.

Both components were continuously gravimetrically dosed to the feed hopper of the processing extruder. In the case of GPPS the total feed rate was 15.6 kg/h and in the case of HIPS it was 14.7 kg/h. A conventional Collin single screw extruder type E25P with a Collin flat film extrusion die and a Collin polishing stack were used to produce a 250 mm wide and 1 mm thick sheet. The temperature profile of the extruder was 180° C., 195° C., 230° C., 230° C. and 230° C. The extrusion die was kept at 230° C. and the calendaring rolls at 100° C. The die gap was 1.2 mm and the nip width of the calendaring rolls was 1.0 mm. The line sped was set to 0.8 m/min. The screw was underfed at a speed of 160 rpm. With this set up sheets without visible agglomerates under a binocular magnifier with magnification of 50 could be produced.

10 g of each extruded sheet were then compression moulded between two chromed steel plates at 190° C. The obtained film was optically inspected under a binocular magnifier with magnification of 50 and showed no visible agglomerates.

The invention claimed is:

1. A process for manufacturing a surface-treated compacted material in the form of non-uniform conglomerates having a mean particle size of 10 μm to 10 mm, the process comprising the following steps:
    a) providing at least one primary inorganic powder material at a temperature of between 20° C. and 300° C., wherein the at least one primary inorganic powder material is calcium carbonate that is optionally treated with a fatty acid;
    b) providing at least one molten surface treatment polymer selected from the group consisting of an ethylene copolymer, an ethylene-1-octene copolymer, a metallocene based polypropylene, a polypropylene homopolymer, and an amorphous polypropylene homopolymer;
    c) simultaneously or subsequently feeding the at least one primary inorganic powder material from step a) and the at least one molten surface treatment polymer from step b), and optionally at least one surface treatment agent, into a single screw high speed mixer;
    d) mixing the at least one primary inorganic powder material and the at least one molten surface treatment polymer in the single screw high speed mixer at 400 to 4000 rpm so that the surface treatment polymer forms layers around and totally coats particles of the primary inorganic powder material;
    e) optionally transferring the coated particles of the primary inorganic powder material obtained in step d) to a second single screw high speed mixer and mixing the same; and
    f) cooling the coated particles of the primary inorganic powder material obtained from step d) or e) to directly obtain a surface-treated compacted material in the form of non-uniform conglomerates of the coated particles, wherein the non-uniform conglomerates have a mean particle size of 10 μm to 10 mm, and wherein the surface-treated compacted material (i) comprises 5 to 25 wt % of the surface treatment polymer and 75 to 95 wt % of the at least one primary inorganic powder, (ii) has a screen residue of more than 80 wt. % on a 45 μm screen, and (iii) is free flowing according to DIN-53492.

2. The process according to claim 1, wherein at least one surface treatment agent is fed simultaneously with or after the feeding of the at least one primary inorganic powder material into the single screw high speed mixer.

3. The process according to claim 2, wherein the temperature of the surface treatment agent is between 20° C. and 300° C.

4. The process according to claim 2, wherein the temperature of the surface treatment agent is between 60° C. and 250° C.

5. The process according to claim 2, wherein the temperature of the surface treatment agent is between 60° C. and 120° C.

6. The process according to claim 2, wherein the surface treatment agent is stearic acid, zinc oxide, a synthetic paraffin wax, a polyethylene metallocene wax or a polypropylene wax.

7. The process according to claim 2, wherein the surface-treated compacted material comprises 9.5 wt % of the surface treatment polymer, 0.5 wt % of the surface treatment agent, and 90 wt % of the at least one primary inorganic powder.

8. The process according to claim 2, wherein the at least one surface treatment agent is present in the surface-treated compacted material at 0.5 to 5 wt %.

9. The process according to claim 1, wherein the at least one molten surface treatment polymer is added to and mixed with the surface-treated material of step d) in the second single screw high speed mixer.

10. The process according claim 1, wherein the temperature of the primary inorganic powder material is between 60° C. and 250° C.

11. The process according to claim 1, wherein the inorganic powder is natural ground calcium carbonate (GCC), precipitated calcium carbonate (PCC), or a mixture of GCC and PCC.

12. The process according to claim 1, wherein the inorganic powder is ground calcium carbonate (GCC) selected from marble, chalk, calcite and limestone.

13. The process according to claim 1, wherein the inorganic powder is precipitated calcium carbonate (PCC) selected from aragonitic PCC, vateritic PCC, calcitic PCC, rhombohedral PCC, scalenohedral PCC, or any mixture thereof.

14. The process according to claim 1, wherein the single screw high speed mixer operates at 1000 to 4000 rpm in step d).

15. The process according to claim 1, wherein the single screw high speed mixer operates at 600 to 1300 rpm in step d).

16. The process according to claim 1, wherein the single screw high speed mixer has a length:diameter ratio of 1:1 to 6:1.

17. The process according to claim 1, wherein the single screw high speed mixer has a length:diameter ratio of 2:1 to 5:1.

18. The process according to claim 1, wherein the single screw high speed mixer has a length:diameter ratio of 3:1 to 4:1.

19. The process according to claim 1, wherein the at least primary inorganic powder material is calcium carbonate and is present in the surface-treated compacted material at 86 to 92 wt %.

20. The process according to claim 1, wherein the surface-treated compacted material has a screen residue of more than 90 wt. % on a 45 μm screen.

21. The process according to claim 1, wherein the at least one primary inorganic powder material and the at least one molten surface treatment polymer are mixed in the single screw high speed mixer in step d) at a peripheral speed of 4.7 to 18.8 m/s.

22. The process according to claim 1, wherein the at least one primary inorganic powder material and the at least one molten surface treatment polymer are mixed in the single screw high speed mixer in step d) at a peripheral speed of 4.8 to 36.1 m/s.

23. The process according to claim 1, wherein the at least one primary inorganic powder material and the at least one molten surface treatment polymer are mixed in the single screw high speed mixer in step d) at a peripheral speed of 4.7 to 10.2 m/s.

* * * * *